US012675989B2

(12) United States Patent
Qu et al.

(10) Patent No.: US 12,675,989 B2
(45) Date of Patent: *Jul. 7, 2026

(54) FUSION MODEL TRAINING USING DISTANCE METRICS

(71) Applicant: SAMSUNG DISPLAY CO., LTD., Yongin-si (KR)

(72) Inventors: Shuhui Qu, Fremont, CA (US); Janghwan Lee, Pleasanton, CA (US); Yan Kang, Sunnyvale, CA (US); Jinghua Yao, San Jose, CA (US); Sai MarapaReddy, Newark, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,923

(22) Filed: Apr. 1, 2024

(65) Prior Publication Data

US 2024/0242494 A1 Jul. 18, 2024

Related U.S. Application Data

(63) Continuation of application No. 16/938,857, filed on Jul. 24, 2020, now Pat. No. 11,948,347.

(Continued)

(51) Int. Cl.
*G06V 10/82* (2022.01)
*G06F 18/21* (2023.01)
(Continued)

(52) U.S. Cl.
CPC .......... *G06V 10/82* (2022.01); *G06F 18/2113* (2023.01); *G06F 18/217* (2023.01);
(Continued)

(58) Field of Classification Search
CPC ....................................................... G06N 3/08
See application file for complete search history.

(56) References Cited

U.S. PATENT DOCUMENTS

2011/0103682 A1 5/2011 Childovskii et al.
2011/0130850 A1 6/2011 Zheng et al.
(Continued)

FOREIGN PATENT DOCUMENTS

CN 103942562 A 7/2014
CN 111449666 A * 7/2020 ............... A61B 6/04
WO WO-2012083136 A1 * 6/2012 ............... G01V 3/14

OTHER PUBLICATIONS

Liu "Distance Monitoring Method Device, Vascular Machine, Electronic Device and Storage Medium", CN 111449666 A, 2020, pp. 24.*

(Continued)

*Primary Examiner* — Vincent Gonzales
(74) *Attorney, Agent, or Firm* — Womble Bond Dickinson (US) LLP

(57) ABSTRACT

A method and a system are presented for controlling a performance of a fusion model. The method includes obtaining a first set and a second set of candidate models for a first and second neural networks, respectively. Each of the first and second set of candidate models is pre-trained with a first source and a second source, respectively. For each possible pairing of one candidate model from the first neural network and one candidate model from the second neural network, a model distance $D_m$ is determined. A subset of possible pairings of one first candidate model and one second candidate model is selected based on the model distance $D_m$ between them. Using the subset of possible parings, the first neural network and the second neural network are combined to generate two branches for a fusion model neural network.

20 Claims, 10 Drawing Sheets

The model distance

Input data D → Pre-trained model 1 → Latent feature space 1

Input data D → Pre-trained model 2 → Latent feature space 2

Feature space distance measures

Model distance $D_m(m_1, m_2, D)$

Predict the performance gain using the model distance

Performance of model 1 on D

Model distance $D_m(m_1, m_2, D)$ → Prediction model → Estimate the performance of the multi-modal model Performance of model 2 on D

Related U.S. Application Data

(60) Provisional application No. 63/008,484, filed on Apr. 10, 2020.

(51) Int. Cl.

| | |
|---|---|
| *G06F 18/2113* | (2023.01) |
| *G06F 18/22* | (2023.01) |
| *G06F 18/25* | (2023.01) |
| *G06N 3/045* | (2023.01) |
| *G06N 3/08* | (2023.01) |
| *G06V 10/764* | (2022.01) |
| *G06V 10/80* | (2022.01) |

(52) U.S. Cl.
CPC ............ *G06F 18/22* (2023.01); *G06F 18/251* (2023.01); *G06N 3/045* (2023.01); *G06N 3/08* (2013.01); *G06V 10/764* (2022.01); *G06V 10/809* (2022.01); *G06V 10/811* (2022.01)

(56) References Cited

U.S. PATENT DOCUMENTS

| | | | |
|---|---|---|---|
| 2011/0150324 A1* | 6/2011 | Ngan | .................. G06V 10/462 |
| | | | 382/159 |
| 2011/0170781 A1 | 7/2011 | Bronstein et al. | |
| 2013/0322741 A1 | 12/2013 | Lee et al. | |
| 2017/0127133 A1 | 5/2017 | Sullivan et al. | |
| 2017/0169582 A1 | 6/2017 | Tanaka et al. | |
| 2019/0147321 A1 | 5/2019 | Miyato | |
| 2019/0279028 A1* | 9/2019 | Wang | .................. G06V 10/764 |
| 2019/0339669 A1 | 11/2019 | Coffman et al. | |
| 2019/0370616 A1 | 12/2019 | Eser et al. | |
| 2022/0269943 A1* | 8/2022 | Szatmary | ................ G06N 5/04 |

OTHER PUBLICATIONS

Yang et a. "Hyperspectral and Multispectral Image Fusion via Deep Two-Branches Convolutional Neural Network", remote sensing, 2018, pp. 23.
Binev et al. "High Quality Image Formation by Nonlocal Means Applied to High-Angle Annular Darkfield Scanning Transmission Electron Microscopy (HAADF-STEM)", 2010, https://www.igpm.rwth-aachen.de/Download/reports/pdf/IGPM317 _k.pdf, pp. 22.

* cited by examiner

*The model distance*

*Predict the performance gain using the model distance*

FUSION MODEL TRAINING USING DISTANCE METRICS

CROSS-REFERENCE TO RELATED APPLICATION

This application is a continuation of U.S. patent application Ser. No. 16/938,857, filed Jul. 24, 2020, which claims priority to and benefit of U.S. Provisional Application No. 63/008,484 filed on Apr. 10, 2020 under 35 U.S.C. 119(e)(1), the entire contents of which are hereby expressly incorporated by reference herein.

BACKGROUND

The display industry has grown rapidly in recent years. In keeping up with the demand, new types of display panel modules and different production methods are being deployed and product specifications are being tightened. Maintaining production quality amidst these changes often call for enhanced equipment and quality control methods. More specifically, early fault detection, abnormal process status predication, and quality fault prediction are desired.

In manufacturing display panels, a defect review system is used to classify defects and help determine the root cause of the defect. The defect review system typically accomplishes this by acquiring high-resolution (sub-micron level) images around defect areas. Based on the acquired images, an operator can classify the defects into categories in accordance with the type of the defects and how the defects may affect the production yield. In more detail, an operator samples a number of defect images and spends significant time searching for features to separate unclassified defect images into categories. Not only is this process time-consuming, it lacks consistency because classifications vary from operator to operator.

Automated defect classification systems have been developed to address the speed and consistency issues above, and some systems use complex machine learning approaches. Achieving the desired level of speed and accuracy, however, remains a challenge due to various factors such as different types and high number of images, accurate identification of a defect (if any) in each of those images, and determination of how much weight/significance to put on each defect.

A faster and more accurate image-based defect detection/identification (IBDI) system is desired.

SUMMARY OF INVENTION

A system and a method are presented for controlling a performance of a fusion model. A computer-implemented method includes obtaining a first set of candidate models for a first neural network, respectively. Each of the first and second set of candidate models is pre-trained with a first source and a second source, respectively. For each possible pairing of one candidate model from the first neural network and one candidate model from the second neural network, a model distance $D_m$ is determined. A pair of candidate models—one for the first neural network and one for the second neural network—is selected based on the model distances $D_m$ between them, and the subset of possible pairings is used to combine the first neural network and the second neural network to form two branches for a fusion model neural network.

In another example a system for image-based predictions includes a first neural network pre-trained with a first set of candidate models using a first source as input data, a second neural network pre-trained with a second set of candidate models using a second source as input data, and a processor configured to calculate a model distance $D_m$ for each pairing of one first candidate model from the first set of candidate models and one second candidate model from the second set of candidate models. A fusion model results from a selected pairing of the first and second neural networks based on the model distance $D_m$.

DETAILED DESCRIPTION

Although the disclosure is provided in the context of display panel manufacturing, the described systems and methods may be applied to other identification and categorization applications, such as defect identification and categorization for semiconductor manufacturing. Also, while the disclosure is in the context of multi-source data including two branches, this is not a limitation of the inventive concept.

In conventional image classification problems, one "instance" in a dataset is usually a single image, and a neural network model will be trained on these images to make sure the loss between predicted probabilities and the ground truth is minimized. For example, if a neural network is being trained to identify a cat, it would be trained with a series of single images, each image showing one or more cats (positive) or no cat (negative). In the image-based defect detection/identification (IBDI) context, a dataset may be different from the cat example above. Each "instance" in IBDI dataset contains multiple sources of data (e.g., microscopy images and spectroscopy images, or TEM images and High-Angle Annular Dark-Field (HAADF) images) and the data from each source is represented as one or more independent images. For example, output of the HAADF imager may be multiple images, each one attuned to a different element/material. Accordingly, a neural network for an IBDI system may include different branches, where each branch includes one or more models associated with a data source corresponding to the branch.

Figure 1:
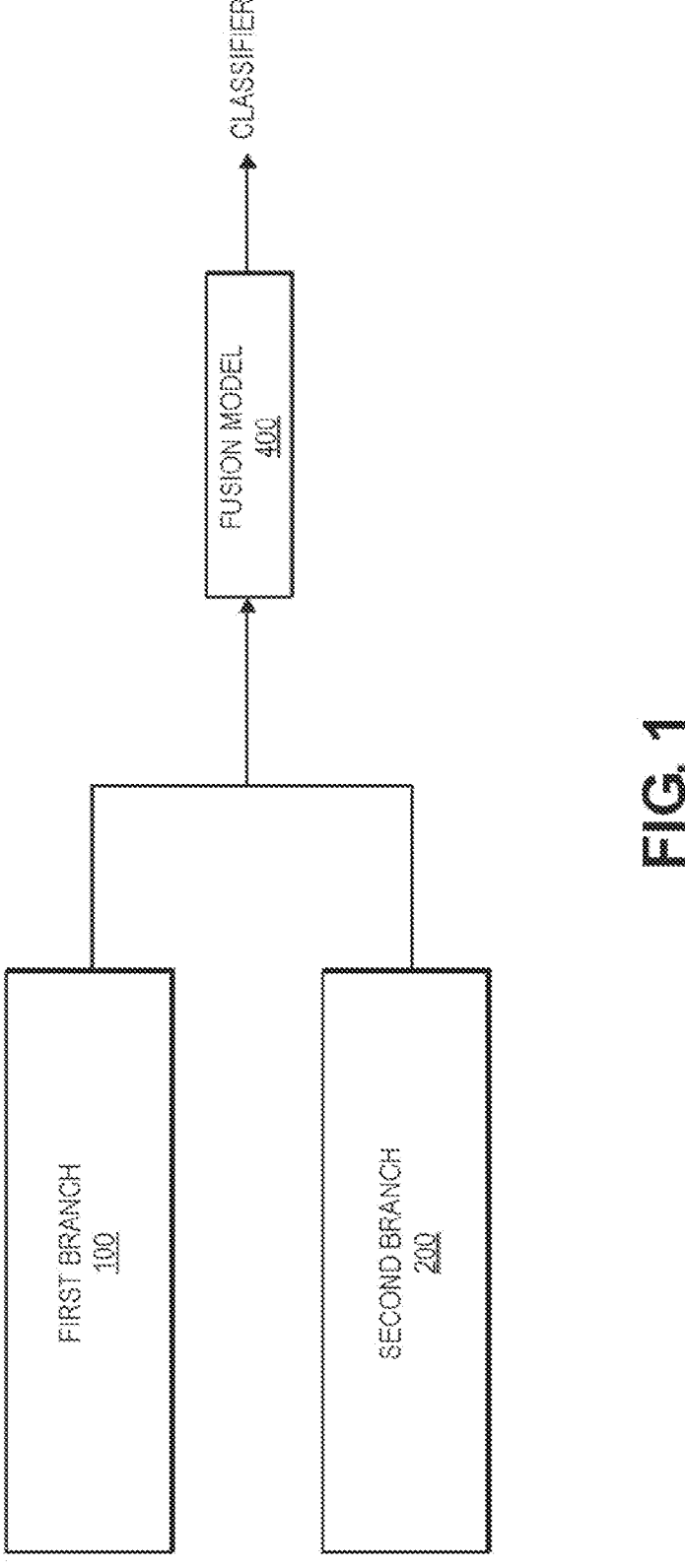
FIG. 1 schematically depicts a multi-modal IBDI system in accordance with an embodiment of the inventive concept.

FIG. 1 schematically depicts a multi-modal IBDI system in accordance with an embodiment of the inventive concept. The system includes a first branch neural network 100 configured to receive or obtain a set of first data that is internally aligned to train one or more models in the first branch 100. A set of data being "internally aligned," as used herein, means being collected from the same data acquisition system or using the same data acquisition source. The system further includes a second branch neural network 200 configured to receive a set of second data that is internally aligned to train one or more models in the second branch 200 independently of the first branch 100. The second data set may be collected from a different data acquisition system from the first data set, but based on the same product or object. The first data may be from a first data acquisition system (e.g., a TEM image source) and the second data may be from a second data acquisition system (e.g., a HAADF image source). The IBDI system joins one or more selected models of the first branch 100 and one or more selected models of the second branch 200 through convolutional layers in a fusion model 400 above the first and second branches 100, 200. More specifically, an output of the first branch 100 and an output of the second branch may be joined by concatenating the two outputs or performing an operation (e.g., dot product) on the two outputs. Selection of the one or more selected models of the first branch 100 and the one or more selected models of the second branch 200 is described further below.

Each of the first data set (e.g., first data/source) and the second data set (e.g., second data/source) is input with different properties (e.g., scale, resolution) such that the different sets of images in the respective data set provide information from different perspectives. The first data set in the first branch 100 may not be aligned with the second data set in the second branch because, as mentioned above, the first data set and the second data set are collected using different systems/sources, which may have different formats. The format could be color pattern, image angle, scale, scope, texture, etc. In some examples, the data sources for the first branch 100 are microscopy images such as Transmission Electron Microscopy (TEM) images, and the data sources for the second branch 200 are spectroscopy images, such as Energy-Dispersive X-ray Spectrocopy (EDS) images taken in parallel with High-Angle Annular Dark-Field (HAADF) images. The first data set and the second data set are not limited to being still images, as in the example embodiment described herein. For example, each of the first data set and the second data set may independently be video, text, image, Lidar data, radar data, image fusion data, etc.

Due to the first data set and the second data set being collected from different data acquisition systems and not being internally aligned, each set of data is trained separately. Hence, one or more models of the first branch 100 and one or more models of the second branch 200 are trained independently. This is achieved by initializing each branch model by a model that is pre-trained from one single data acquisition system. Many branch models in the first branch 100 may be trained from one single data source (e.g., the first data set) using different model structures, hyper-parameters, etc. and an equally large number of models in the second branch 200 may be trained using another data source (e.g., the second data set). For each single source of data, several models are constructed with different architecture and learning hyper-parameters, e.g., architecture of VGG neural network, architecture of mobilenet neural network, architecture of residue neural network with different learning hyperparameters. Accordingly, the first branch 100 may include many different models and the second branch 200 may include many different models and even more possibilities for different combinations of models from the first branch 100 and second branch 200 may exist. Different models would capture different features.

A branch model may be trained using more than one data source. In one implementation, a first model branch may use an image as a source and a second model branch may use the image's description as a source. The branches would have different properties, as one is processing an image and the other one is processing text. When two branches receive outputs from two different data acquisition systems (e.g., HAADF image and TEM image), they are like image and text, and may be used as input to one branch.

After each branch is initialized this way, the fusion model (convolutional layer 400) is trained. A training time for the fusion model 400 may be based on a number of pairings of a model in the first branch 100 and a model in the second branch 200 used to generate the fusion model 400. Generating and training the fusion model 400 based on every possible combination of models from the first branch 100 and the second branch 200 may be time consuming. During training, the first branch 100 takes an input from the first data acquisition system and generates a first output feature. The second branch 200 takes an input from the second data acquisition system and generates a second output feature. The first and the second output features are joined/fused as the input to the fusion model 400, which is a neural network layer, for training. The fusion model 400 takes the fused version of the first and second output features and outputs predictions.

The method and system of the disclosure provides a mechanism for selecting one or more pre-trained single-source models for the first branch 100 and one or more pre-trained single-source models for the second branch 200 to be combined into a multi-mode fusion model 400. Selection of the pre-trained single-source model may be done by the disclosed systems and methods by examining distance metrics between various candidate models, and predicting a multi-modal model's potential accuracy, based on the distance metrics, before actually training the multi-modal model. Selecting the one or more models based on the distance metrics may result in a more accurate fusion model as compared to a system that selects models for inclusion in the fusion model based solely on performance of the models individually. The distance metric measure for models is expressed as $D_m$ ($m_1$, $m_2$, D), and expresses the distance between latent feature spaces of the respective models, where:

$m_1$ is a model 1 pretrained by dataset D $m_2$ is a model 2 pretrained by dataset D The disclosed systems and methods may be configured to determine, for each sample (e.g., instance) s=x, y in D, a distance between $\hat{f}_{m_1}(x)$ and $\hat{f}_{m_2}(y)$: $d_s(\hat{f}_{m_1}(x), \hat{f}_{m_2}(y))$. The disclosed systems and methods may further be configured to determine $D_m(m_1, m_2, D) = \Sigma_D d_s(\hat{f}_{m_1}(x), \hat{f}_{m_2}(y))$, where $d_s$ may be the Wasserstein distance, with mutual information loss as a measure. As used herein, $\hat{f}_{m_1}(x)$ indicates that model 1 takes in data sample x using data acquisition system 1, and $\hat{f}_{m_2}(y)$ indicates that model 2 takes in data sample y using data acquisition system 2.

Figure 2:
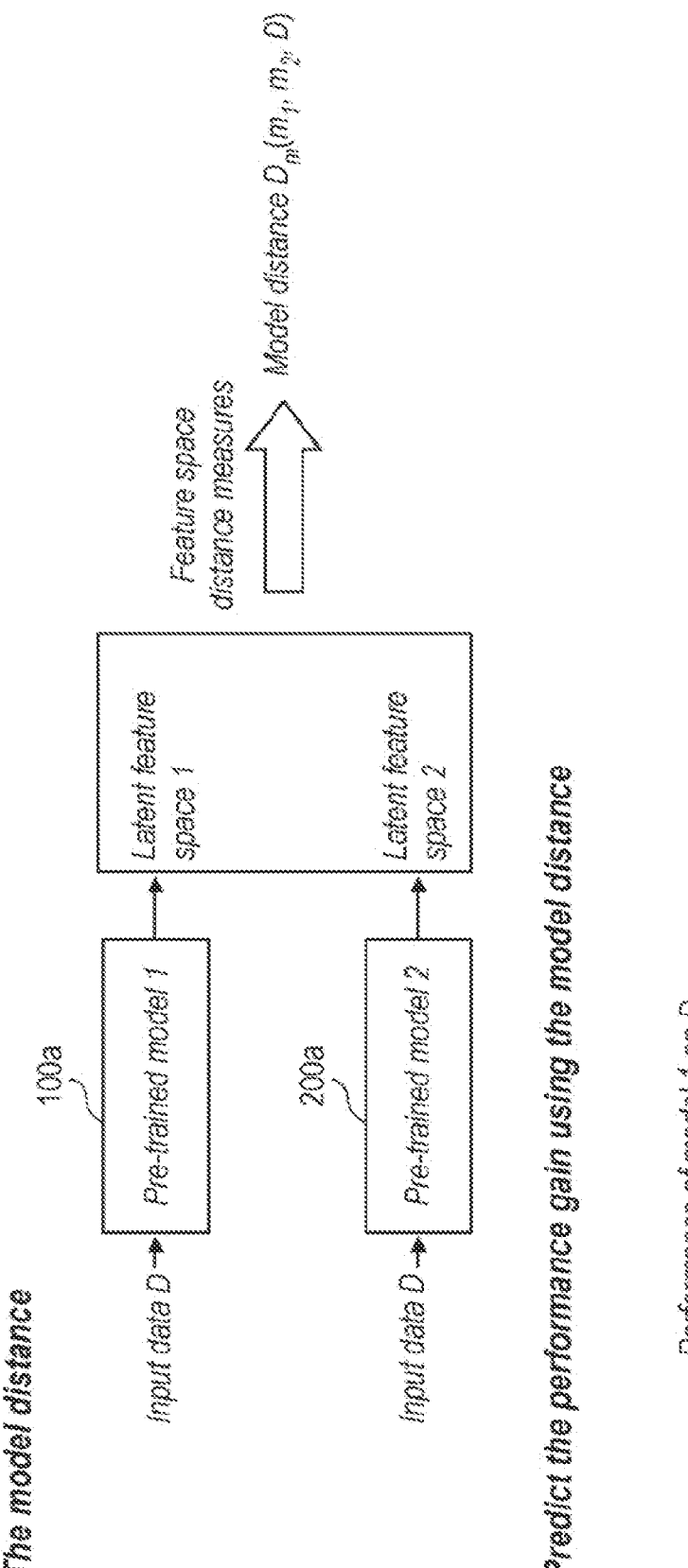
FIG. 2 schematically depicts model distance generation process in accordance with an embodiment of the inventive concept.
Figure 2:
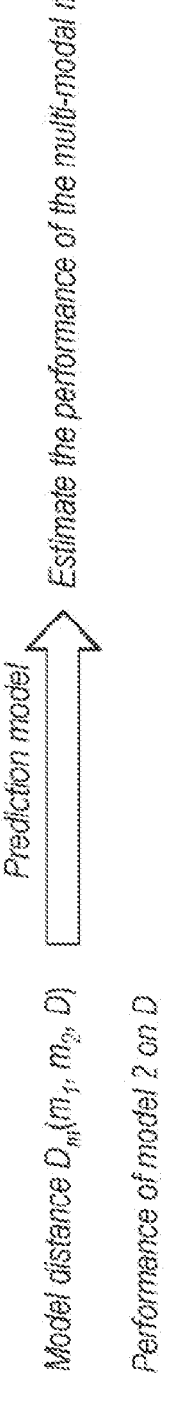

FIG. 2 is a diagram depicting determination of the model distance $D_m$ between a first model 100a (e.g., of the first branch 100) and a second model 200a (e.g., of the second branch 200). As shown, input data D is fed into the first model 100a, and the second model 200a. For example, the input data D may include a set of instances/samples, where each instance/sample, s, includes a first image, x, (e.g., a TEM image) and a second image, y, (e.g., a HAADF image). The first model 100a may receive the first images (e.g., a first type of images) and the second model 200a may receive the second images (e.g., a second type of images). In some cases, the first model 100*a* and the second model 100*b* may have the same data source input, e.g. both models may receive a first image x. In response to the input data D, the first model 100*a* is configured to output a first latent feature space and the second model 200*a* is configured to output a second latent feature space. The disclosed systems and methods are configured to determine a distance between the feature spaces output from the two branches to generate model distance $D_m$, as described above.

As shown in the bottom half of FIG. 2, disclosed systems and methods are further configured to predict the performance of a multi-modal fusion model generated using the first model 100*a* and the second model 200*a* based on the model distance $D_m$ between the first model 100*a* and the second model 200*a*, based on performance of the first model 100*a* on D, based on performance of the second model 200*a* on D, or a combination thereof. The performance improvement of the multi-modal fusion model correlates with the model distance $D_m$. A linear line is fit into a plot showing performance as a function of model distance $D_m$. Hence, with each branch's model information such as performance and the model distance between the two models, the accuracy improvement is determined.

In some examples, the distance metric, $D_m$, is implemented as a Wasserstein distance (with mutual information loss as a measure), as described above. However, in other examples, the disclosed systems and methods utilize a different distance measure. For example, the disclosed systems and methods may determine a Euclidean distance, Mahalanobis distance, Maximum mean discrepancy, or the like between feature spaces output by the first model 100*a* and the second model 200*a*. The Wasserstein Distance and mutual information correlate to improvements in fusion model performance, and this correlation can be used to predict the final performance given any two pre-trained models.

Figure 3:
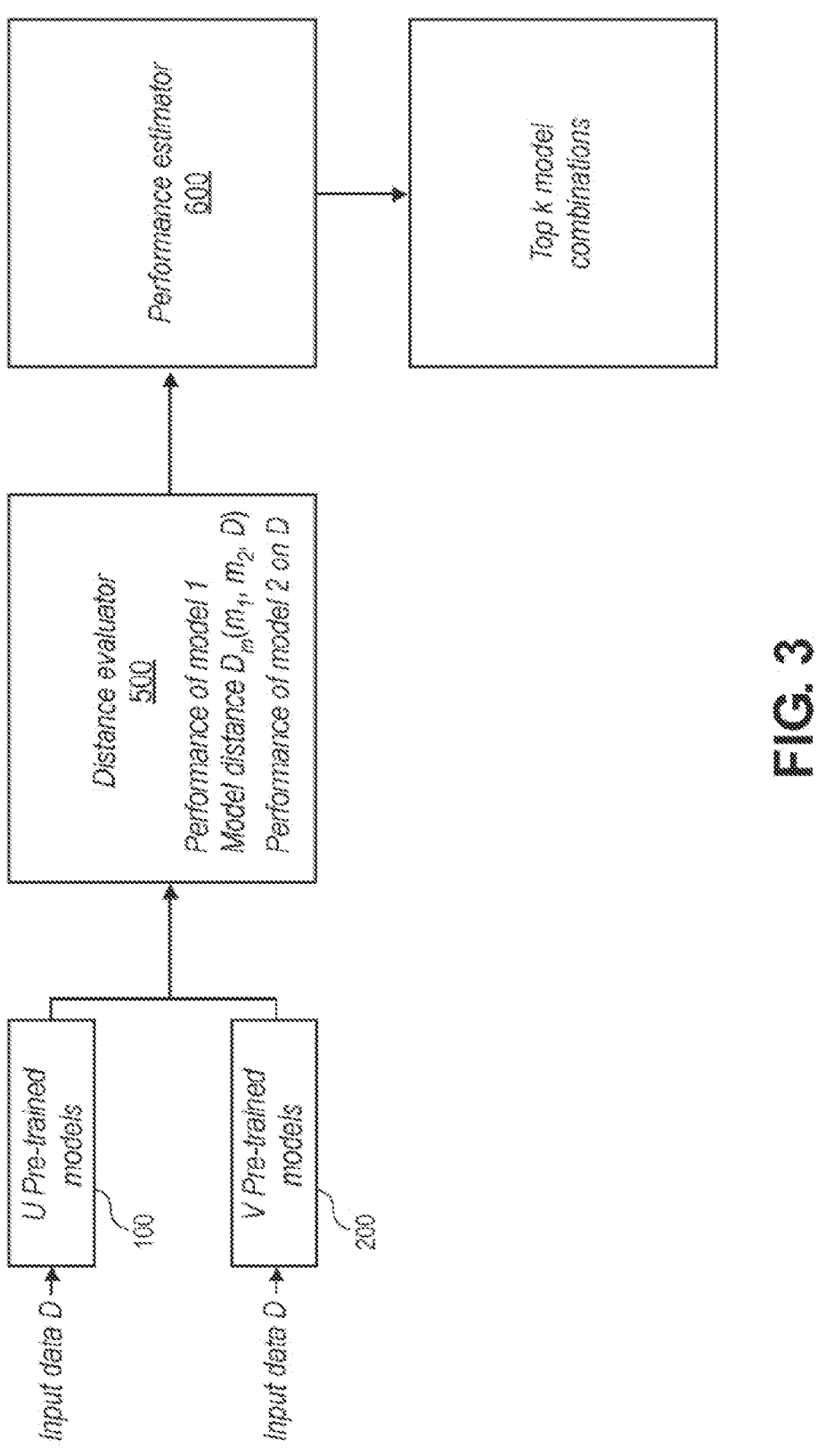
FIG. 3 schematically depicts an automated top-K pair selection process in accordance with an embodiment of the inventive concept.

There may be a plurality of pairings of models from the first branch 100 and the second branch 200, where each pairing includes a model from the first branch 100 and a model from the second branch 200. The disclosed systems and methods may determine, for each pairing, a predicted performance of a multi-modal fusion model generated using the pairing, as described above. The disclosed systems and methods may generate and train K fusion models based on a top-K pairings. FIG. 3 schematically depicts an automated top-K pair selection process. As shown, the first branch 100 includes U pre-trained models using input data D, and the second branch 200 includes V pre-trained models using input data D. For each pairing of one of the U pre-trained models of the first branch 100 and one of the V pre-trained models of the second branch 200, the Distance evaluator 500 determines the model distance Dm. The model distances Dm of the various pairings are used to estimate performance by the Performance Estimator 600. In one embodiment, the Performance Estimator 600 fits a line into a plot of model distance $D_m$. As mentioned above, the model distance $D_m$ correlates with performance improvement. Hence, the linear model generated by the Performance Estimator 600 predicts relative performance improvement and the performance of the branch model that was used. Hence, the multi-modal fusion model's performance may be estimated based on the $D_m$ and the line. Then, disclosed systems and methods select the model pairings that produce the top K performance. The top K pairs are then used to generate full fusion models (e.g., one fusion model 400 is generated per pairing), and to train such fusion models. This process being automated saves substantial time compared to training every possible combination, and leads to better overall performance than human-estimate-based guesses as to which subset of pairs might yield the best results.

Figure 4:
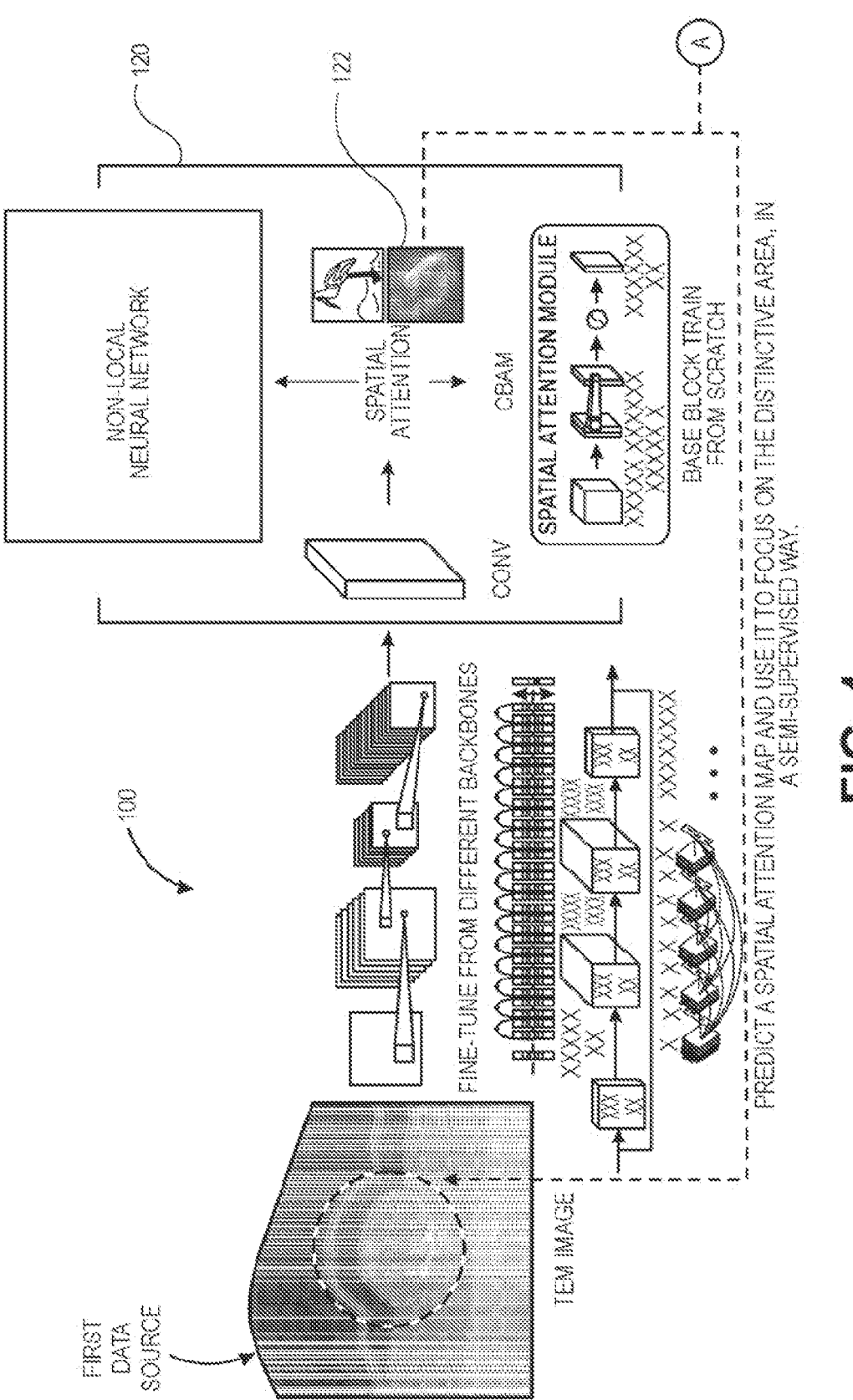
FIG. 4 depicts a multi-modal model that may be used with an embodiment of the inventive concept.
Figure 4:
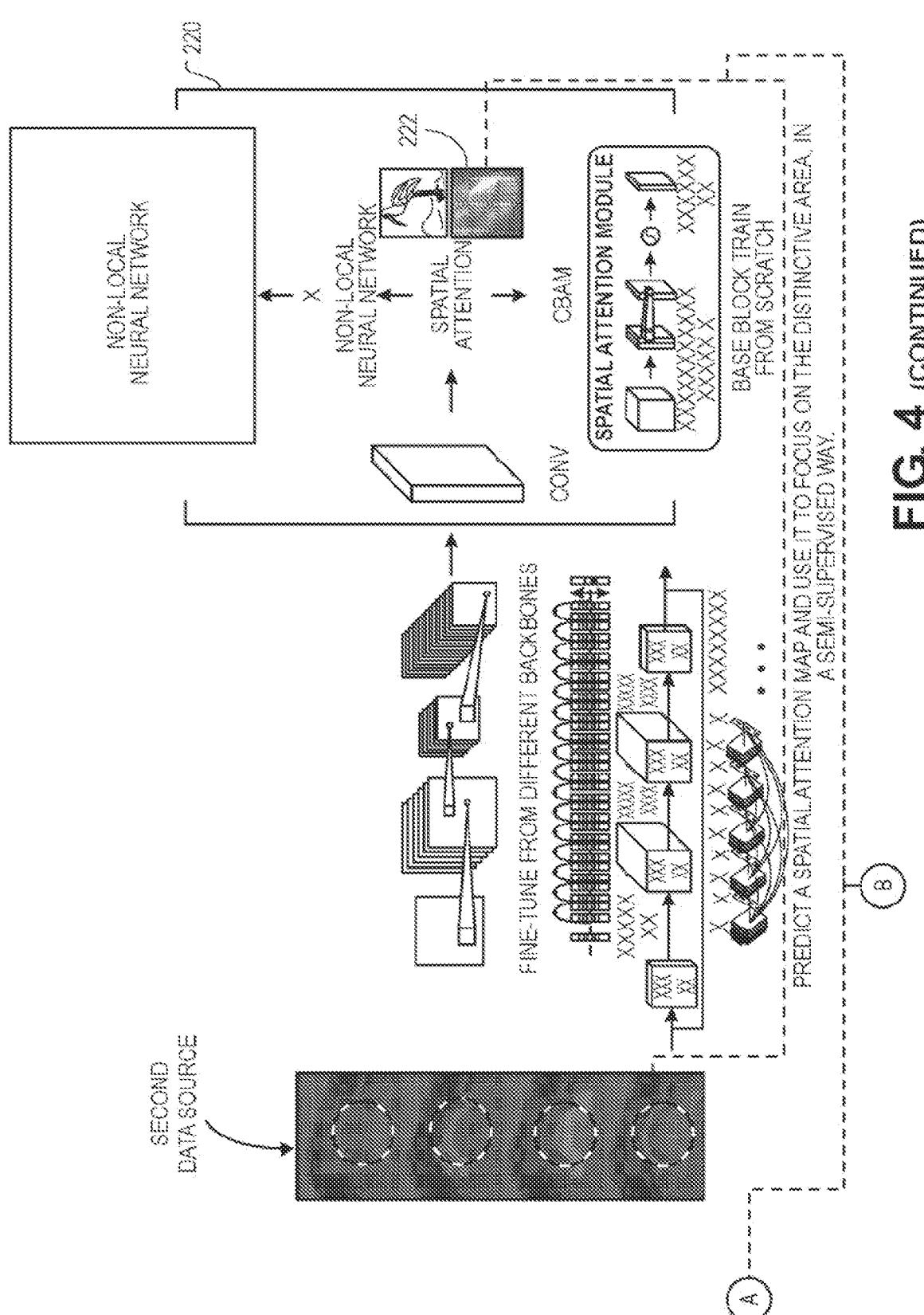
Figure 4:
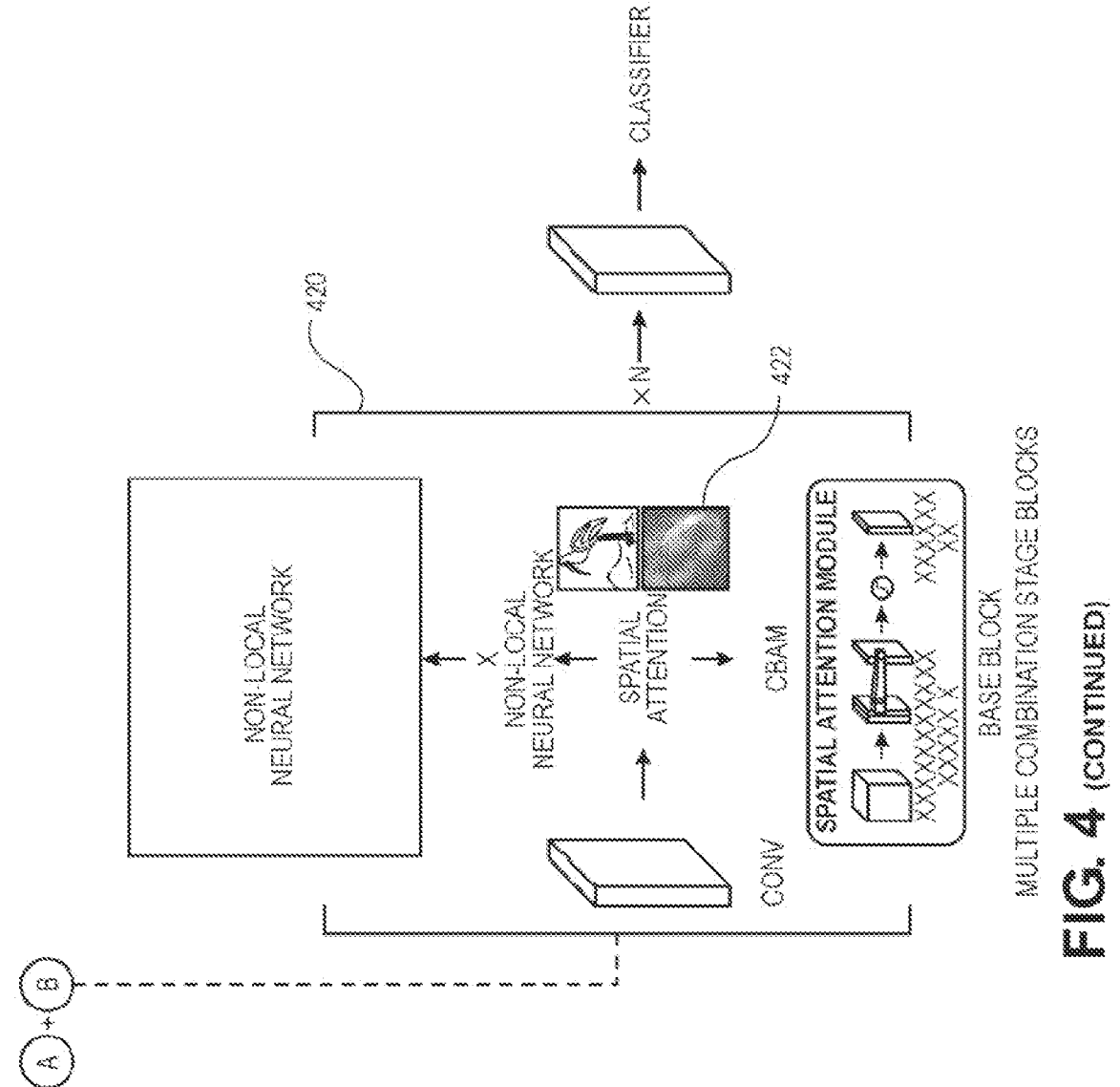

FIG. 4 depicts a multi-modal model that may be used with an embodiment of the inventive concept. The first branch 100 receives a first set of data (e.g., images from a first source/data acquisition system) to extract features. The second branch 200 receives a second set of data (e.g., images from a second source/data acquisition system), which may not be aligned with the first set of data. The first branch 100 is independently pre-trained by U models, and the second branch 200 is independently pre-trained by V different models. If training the multi-modal model takes time t, trying all the different possible combinations would take U*V*t amount of time. However, using the distance metric $D_m$ shown above, calculation of which can be done fast, the performance gain can be quickly calculated: $\{D_m(m_1, m_2, D)\}_{m1\in M_1, m2\in M_2}$. The top-K pairs are selected, and the fusion model can be trained with the top-K pairs in the convolutional layer 400 to generate a high-performing classifier. The amount of time that is saved by using the distance model is (U*V-k)t.

In the example multi-modal model of FIG. 4 the first branch 100 may receive images from a first data source as input, and the second branch 200 may receive images from a second data source as input. For both the first branch 100 and the second branch 200, a spatial attention heat map 122, 222 is overlaid onto the images to highlight areas where the defect might arise. This is accomplished via an attention module that generates a space map network which is adjusted based on the final predicted defect class (error type/no error) of the image. The space map network represents the spatial relationship between the input data and the final defect layer decision. In the example of FIG. 4, the branch neural networks and the fusion neural network each have N blocks, "N" being a parameter that describes the depth of the neural network.

In some embodiments, the attention modules may be Convolutional Block Attention Module (CBAM), which is an effective attention module for feed-forward convolutional neural networks. In some embodiments, the CBAM provides spatial and channel attention. The spatial attention is a space-heat map related to error location, and the channel attention is related to the color/grayscale channel of the data. In each branch, the CBAM model is trained for the localization function. In the example embodiment of FIG. 4, MobileNetV2-CBAM is used for a block. The MobileNetV2 portion of the block is herein referred to as the "backbone," and is trained independently before being used on a large image classification dataset. FIG. 4 shows that the CBAM portion is trained from scratch and it could be integrated with any of the different backbones. As shown, the backbone portion is not trained from scratch but fine-tuned along with CBAM for the classification. This fine-tuning optimizes or improves classification performance.

A CBAM receives a feature map as input, and sequentially infers a one-dimensional channel attention map and a two-dimensional spatial attention map. The channel attention module focuses on "what" is meaningful given an input image. The spatial attention module focuses on "where" the informative part is, and is complementary to the channel attention. The specific method of computing the channel attention and spatial attention are known, and may be found in publications such as Woo, "CBAM: Convolutional Block Attention Module," ECCV 2018. In an example where a feature map $F \in R^{C \times H \times W}$ is received as input, the overall attention process may be summarized as follows:

$$F' = M_c(F) \otimes F,$$

$$F'' = M_s(F') \otimes F',$$

wherein $\otimes$ denotes element-wise multiplication. During multiplication, the attention values are broadcasted (copied) accordingly: channel attention values are broadcasted along the spatial dimension, and spatial attention values are broadcasted along the channel dimension. F" is the output of the CBAM.

Figure 5:
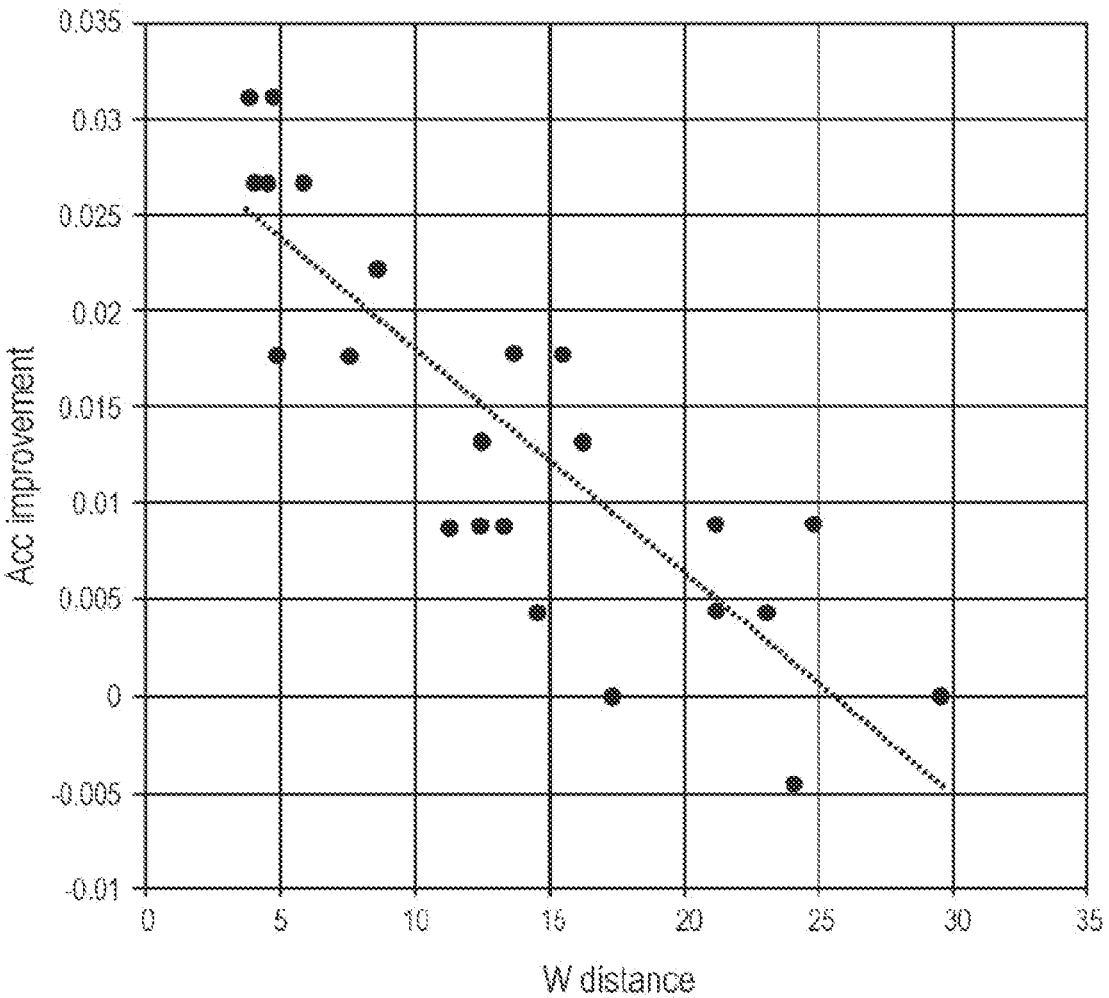
FIG. 5 graphically depicts correlation between accuracy improvement and model distance Dm.
Figure 6:
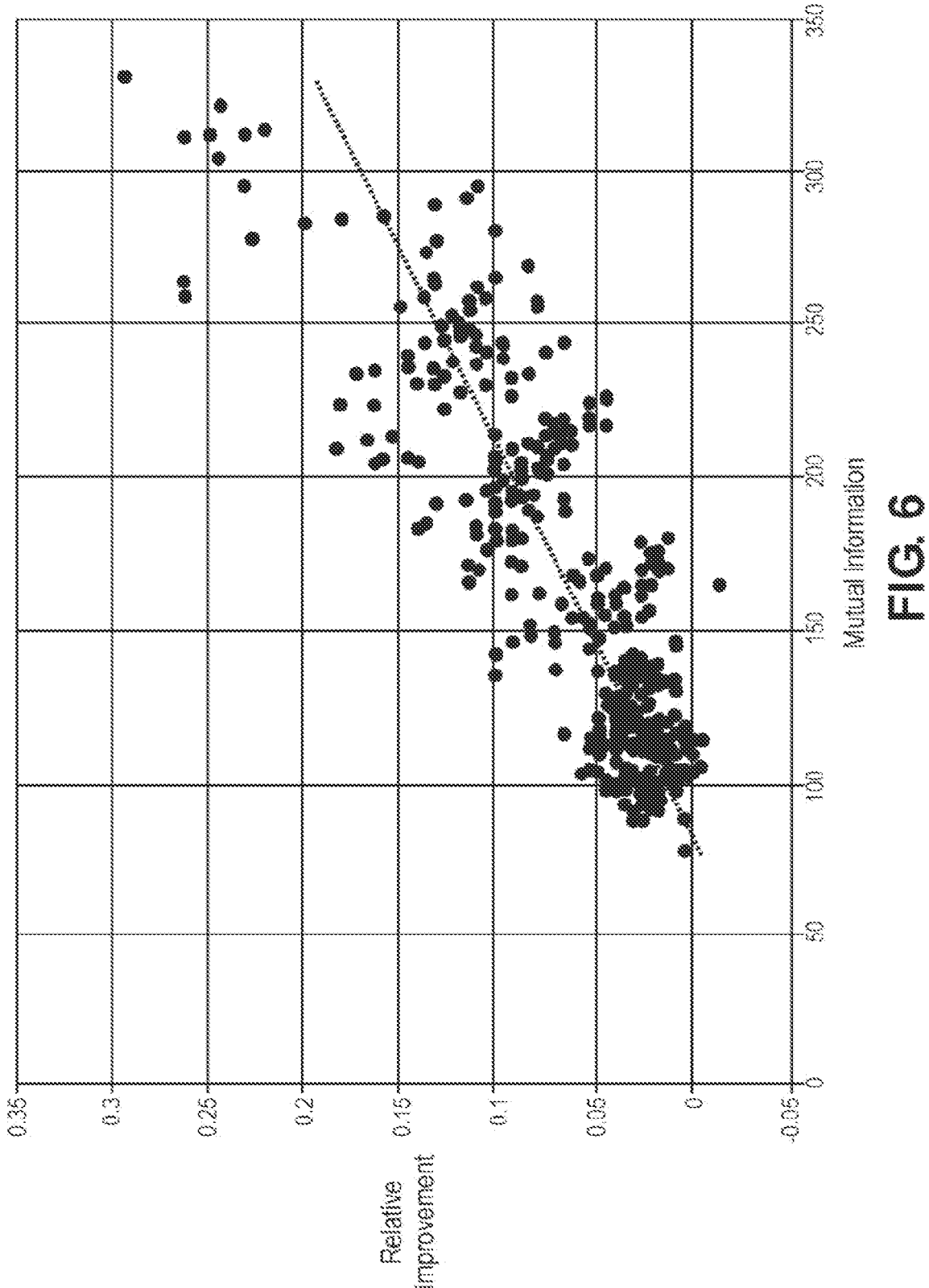
FIG. 6 graphically depicts correlation between mutual information and relative improvement.

FIG. 5 and FIG. 6 depict correlations between performance improvement and model distance Dm. More specifically, FIG. 5 depicts correlation between accuracy improvement and model distance Dm. FIG. 5 shows the effect of Wasserstein distance (Dm) between model pairings on Accuracy improvement in fusion models generated based on the pairings, based on empirical data. The graphs demonstrate a strong correlation between shorter distance Dm and greater accuracy improvement in fusion models. Hence, based on FIG. 5, the top-K pairings may be K pairings that generate the shortest Dm/Wasserstein distance. FIG. 6 depicts the correlation between mutual information and relative improvement in fusion models generated based on the pairings, based on empirical data. As mutual information increases, so does the amount of improvement.

While the embodiments are described in terms of a method or technique, it should be understood that the disclosure may also cover an article of manufacture that includes a non-transitory computer readable medium on which computer-readable instructions for carrying out embodiments of the method are stored. The computer readable medium may include, for example, semiconductor, magnetic, optomagnetic, optical, or other forms of computer readable medium for storing computer readable code. Further, the disclosure may also cover apparatuses for practicing embodiments of the inventive concept disclosed herein. Such apparatus may include circuits, dedicated and/or programmable, to carry out operations pertaining to embodiments.

Figure 7:
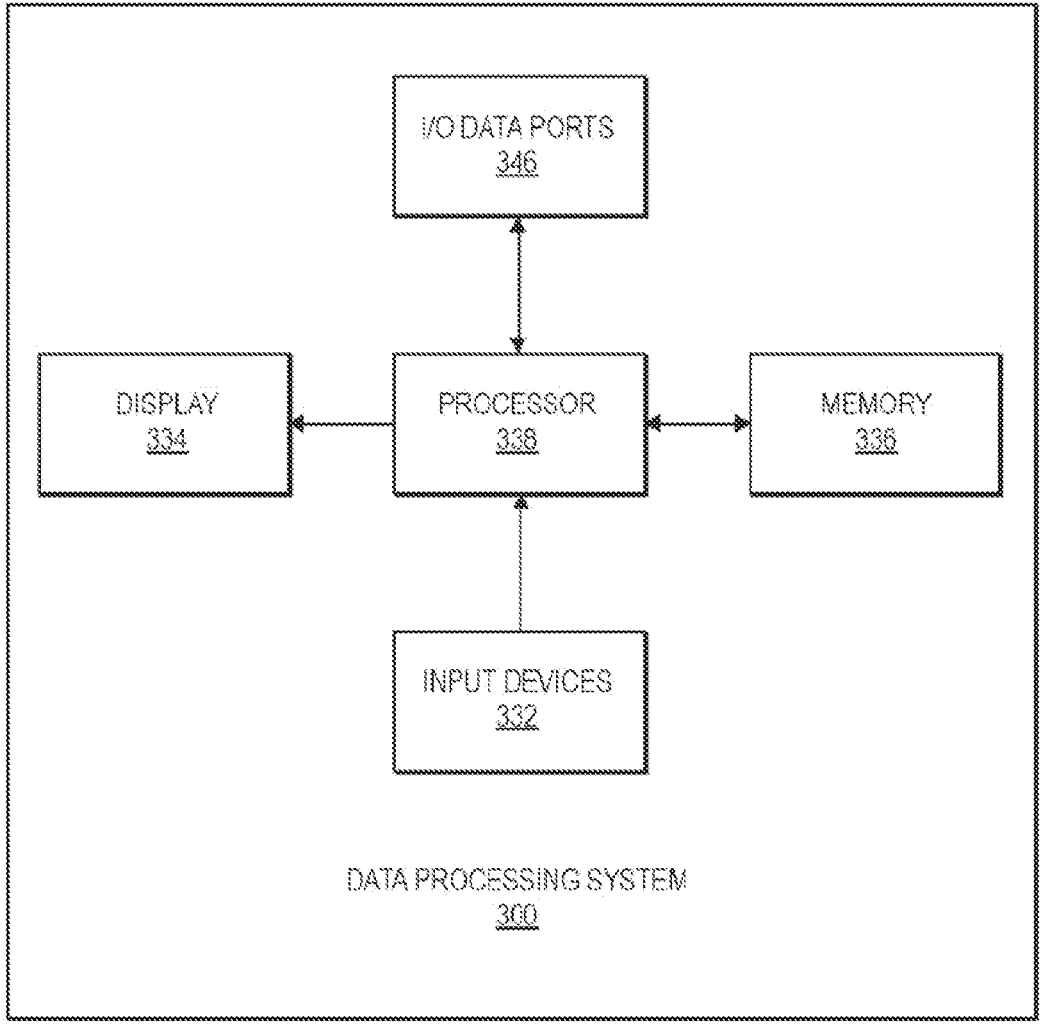
FIG. 7 schematically depicts a data processing system that may be used to implement an embodiment of the inventive concept.

Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to the embodiments. For example, the distance evaluator 500 and the performance estimator 600 shown in FIG. 3 may be implemented as a data processing system 300 such as what is depicted in FIG. 7. The data processing system 300 may include input device(s) 332 such as a keyboard, mouse or keypad, a display 334, and a memory 336 that communicate with a processor 338. The data processing system 330 may further include an I/O data port(s) 346 that also communicates with the processor 338. The I/O data ports 346 can be used to transfer information between the data processing system 330 and another computer system or a network, such as the neural networks 100, 200. These components of the data processing system 300 may be conventional components.

The system of the disclosure is not limited to all of its components being in the same location. For example, in some embodiments, the distance evaluator 500 and the performance estimator 600 of FIG. 3 may be implemented on a distributed computing system. A distributed computing system has its components located on different networked computers that communicate and coordinate their actions. The distance evaluator 500 and the performance estimator 600 may be on different computers. Alternatively, one or both of the distance evaluator 500 and the performance estimator 600 may be distributed across different computers. Other parts of the system may also be distributed where suitable.

Figure 8:
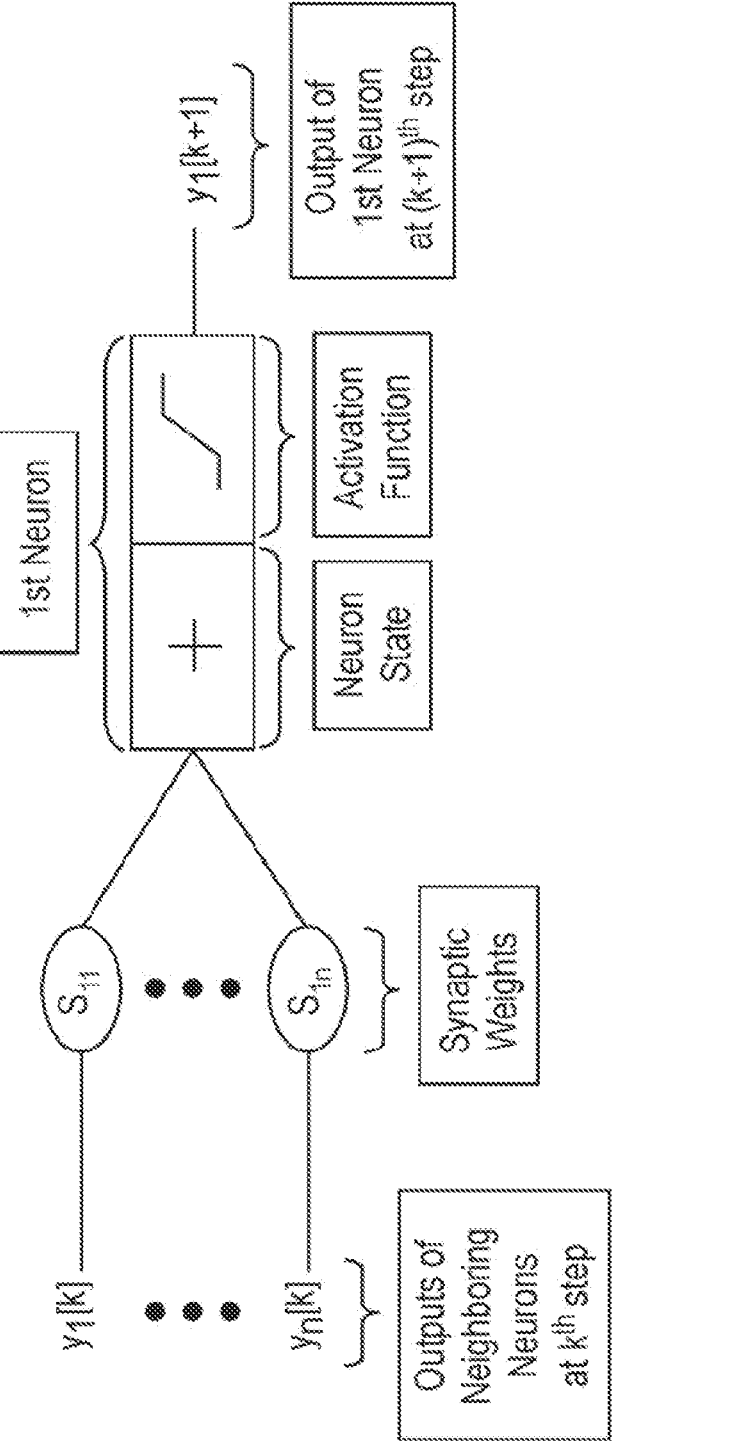
FIG. 8 is a symbolic representation of a neuron-synapse model of a neural network.

Neural networks may be implemented as hardware, software, or a combination. FIG. 8 depicts an example hardware implementation of a neural network that may be used to implement the inventive concept. Hardware implementation of neural networks has been achieved using either analog or digital neuron-synapse circuits, and may have advantages of software implementations such as less complex calculations. The hardware version of neural network, like the software version, mimic neurons and synapses of biological systems, and correspond to the vertices and edges of a graph. FIG. 8 is a symbolic representation of a neuron-synapse model wherein inputs form neighboring neurons are summed using the synaptic weights, and a nonlinear activation function determines the output of the neuron. In building the synapse, the number of synapses scales quadratically with the number of neurons. The synaptic weights are defined with high precision to ensure proper convergence of the algorithm, and have to be updateable. For the neuron state, summation of weighed input is performed. Hardware implementations of neural network are publicly available.

It should be understood that the inventive concept can be practiced with modification and alteration within the spirit and scope of the disclosure. The description is not intended to be exhaustive or to limit the inventive concept to the precise form disclosed.

What is claimed is:

1. A computer-implemented method comprising:
determining model distances between each of pairings of first candidate models of a first neural network and second candidate models of a second neural network, the determining based on the calculated distances between first latent feature spaces of the first candidate models and second latent feature spaces of the second candidate models in response to data samples of an input image;
selecting a subset of pairings from among the pairings of the first candidate models and the second candidate models based on respective model distances between them, the selected subset of pairings having the model distances shorter than other pairings from among the pairings of the first candidate models and the second candidate models;
combining the first neural network and the second neural network to join two branch neural networks for a fusion model neural network based on the selected subset of pairings;
training the fusion model neural network based on the selected subset of pairings to improve performance of the fusion model neural network; and
detecting a defect in an image based on the fusion model neural network having improved performance.

2. The computer-implemented method of claim 1, wherein:
each of the first candidate models is pre-trained with a first source;
each of the second candidate models is pre-trained with a second source; and
each of the model distances and the improved performance of the fusion model neural network is based on mutual information.

3. The computer-implemented method of claim 2, wherein the distance based on mutual information is one of a Wasserstein distance with mutual information loss as a measure, Euclidean distance, Mahalanobix distance, and Maximum mean discrepancy.

4. The computer-implemented method of claim 2, wherein selecting the subset of candidate models for the first neural network and the second neural network comprises selecting a pair that produces a shortest model distance, wherein the shortest model distance is a Wasserstein distance with mutual information loss as a measure.

5. The computer-implemented method of claim 2, wherein the first source is a form of the input image and the data samples.

6. The computer-implemented method of claim 5, wherein the second source is a form of the input image and the data samples, and the first source and the second source are different.

7. The computer-implemented method of claim 2, wherein each of the first source and the second source is one of a spectroscopy image and a microscopy image.

8. The computer-implemented method of claim 2, wherein the first candidate models are models trained from the first source using different model structures and hyper-parameters.

9. The computer-implemented method of claim 2, wherein each of the first source and the second source is one of Transmission Electron Microscopy (TEM) image and High Angle Annular Dark Field (HAADF) image.

10. The computer-implemented method of claim 1, wherein the selected subset of pairings from among the pairings of the first candidate models and the second candidate models have a shortest model distance from among the model distances between the pairings of the first candidate models and the second candidate models.

11. A system for image-based predictions, comprising:
a first neural network;
a second neural network;
a processor determining model distances between each of pairings of first candidate models of the first neural network and second candidate models of the second neural network, the determining based on the calculated distances between first latent feature spaces of the first candidate models and second latent feature spaces of the second candidate models in response to data samples of an input image; and
a fusion model resulting from a selected pairing of the first neural network and the second neural network, the selected pairing of the first neural network and the second neural network having a first model distance that is shorter than the model distances of other pairings of the first candidate models of the first neural network and the second candidate models of the second neural network, the processor detecting a defect in an image for the image-based predictions based on the fusion model neural network.

12. The system of claim 11, wherein:
the first neural network is pre-trained with a first set of candidate models comprising the first candidate models using a first source as input data;
the second neural network is pre-trained with a second set of candidate models comprising the second candidate models using a second source as input data;
the fusion model is trained based on the selected pairing of the first neural network and the second neural network to improve performance of the fusion model;
the first model distance is between a first candidate model from among the first candidate models of the first neural network and a second candidate model from among the second candidate models of the second neural network; and
each of the model distances and the improved performance of the fusion model neural network is based on mutual information.

13. The system of claim 12, wherein the distance based on mutual information is one of a Wasserstein distance with mutual information loss as a measure, Euclidean distance, Mahalanobis distance, and Maximum mean discrepancy.

14. The system of claim 12, wherein the processor selects a pair of candidate models based on the model distance, wherein the model distance is a Wasserstein distance with mutual information loss as a measure, and wherein the pair of candidate models comprises a first candidate model of the first candidate models and a second candidate model of the second candidate models.

15. The system of claim 12, wherein the first source comprises a form of the input image and the data samples from a first data acquisition system.

16. The system of claim 15, wherein the second source comprises a form of the input image and the data samples from a second data acquisition system that is different from the first data acquisition system.

17. The system of claim 12, wherein each of the first source and the second source is one of a spectroscopy image and a microscopy image.

18. The system of claim 12, wherein the processor selects a first number of pairings of the first set of candidate models and the second set of candidate models for training the fusion model, wherein the first number of pairings have shortest model distance.

19. The system of claim 12, wherein the first set of candidate models are models trained from the first source using different model structures and hyper-parameters.

20. The system of claim 12, wherein each of the first source and the second source is one of Transmission Electron Microscopy (TEM) image and High Angle Annular Dark Field (HAADF) image.

* * * * *